Oct. 25, 1949.                C. LOMHOLT                2,485,615
                   INDICATOR FOR TELEPHONE SWITCHBOARDS
Filed Oct. 11, 1947                                2 Sheets-Sheet 1
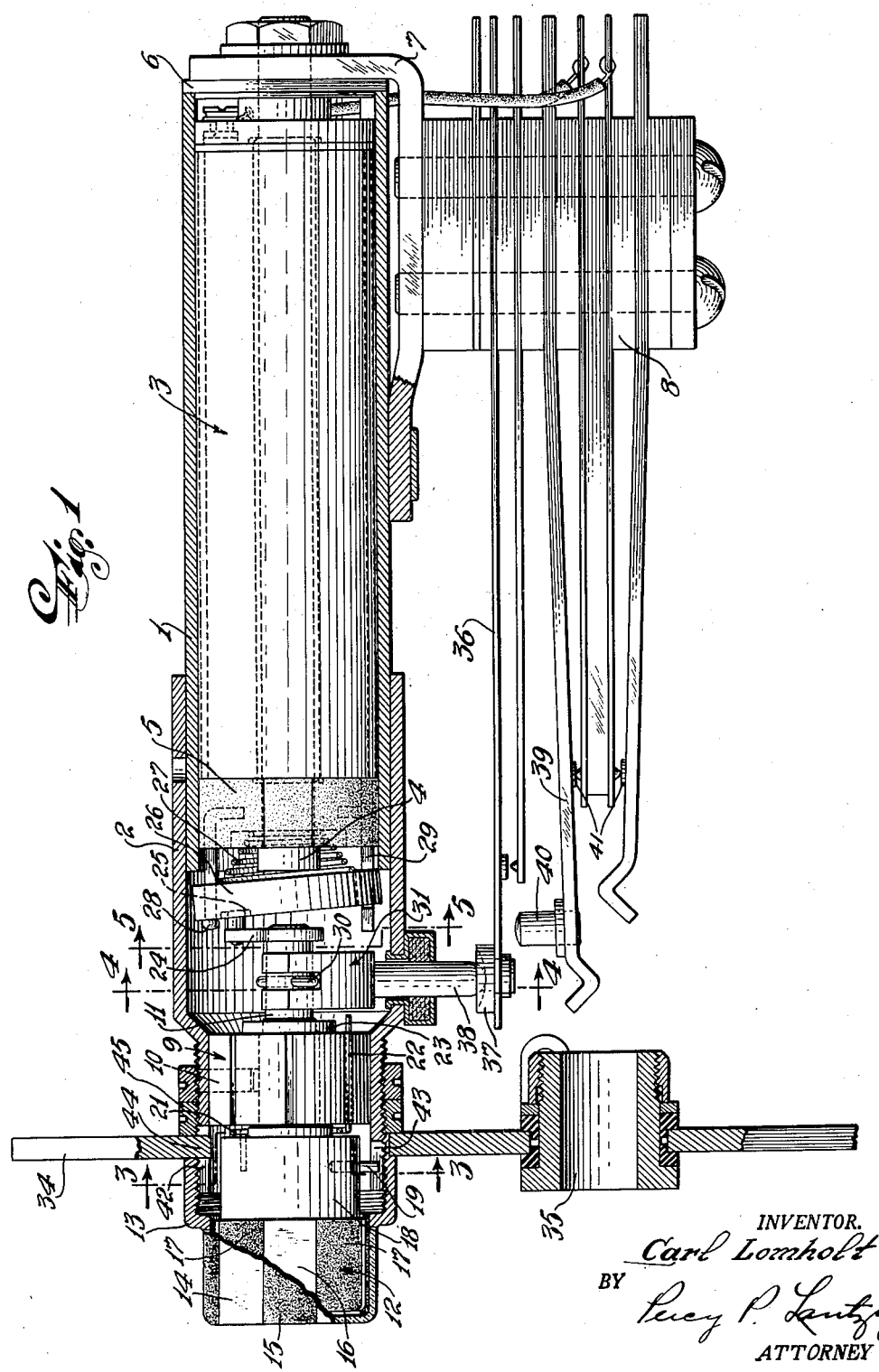
INVENTOR.
Carl Lomholt
BY
Percy P. Lantzy
ATTORNEY Oct. 25, 1949.	C. LOMHOLT	2,485,615
INDICATOR FOR TELEPHONE SWITCHBOARDS
Filed Oct. 11, 1947	2 Sheets-Sheet 2

INVENTOR.
Carl Lomholt
BY
Percy P. Lantz
ATTORNEY

Patented Oct. 25, 1949

2,485,615

UNITED STATES PATENT OFFICE 2,485,615

INDICATOR FOR TELEPHONE SWITCHBOARDS

Carl Lomholt, Bogota, N. J., assignor to Federal Telephone and Radio Corporation, New York, N. Y., a corporation of Delaware Application October 11, 1947, Serial No. 779,318

1 Claim. (Cl. 177—329)

This invention relates to telephone switchboards and more particularly to an indicator therefor adapted to signal the operator when a subscriber desires to make a call.

An object of the invention is to provide a compact indicator for telephone switchboards which requires very little board area and is not dependent on gravity for operation, but will operate regardless of the positioning thereof with respect to the force of gravity.

In accordance with this invention a feature thereof is the compact arrangement of the parts whereby they are housed in a slender tubular casing with the indicator element at one end. By mounting the tubular indicator so that the indicating element protrudes through the switchboard panel, the operator may be signalled when a subscriber's line is connected through to the indicator device. The unit being tubular in shape extends behind the panel and requires a minimum of space.

Another feature of the invention is the control of the indicator element. The indicator element is mounted on a spindle and is normally biased to turn to indicating position by a spring. The spindle is held against operation by a crank arm engageable with an armature. When the electromagnet of the indicator is energized, the armature is attracted thereby releasing the spindle to turn the indicator element to indicating position. The spindle is provided with lateral extensions for engagement with a reset plunger whereby the insertion of a plug in an associated jack will cause the plunger to be actuated and thereby return the spindle to non-indicating position.

The above mentioned and other features and objects of this invention and the matter of attaining them will become more apparent, and the invention itself will be best understood, by reference to the following description of an embodiment of the invention taken in conjunction with the accompanying drawings, wherein:

Fig. 1 is a longitudinal sectional view of the indicator and an associated jack;

Figure 3:
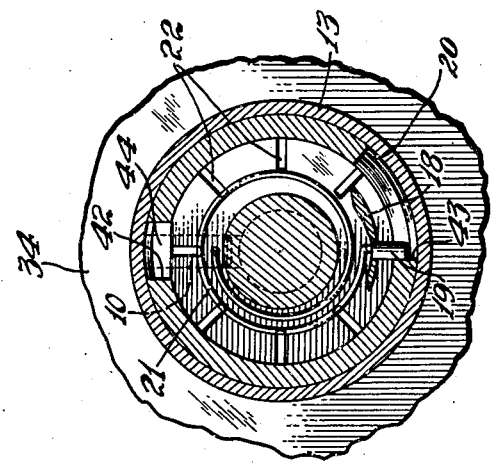
Figure 5:
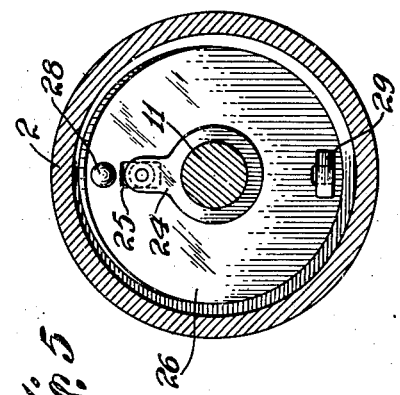
Figure 2:
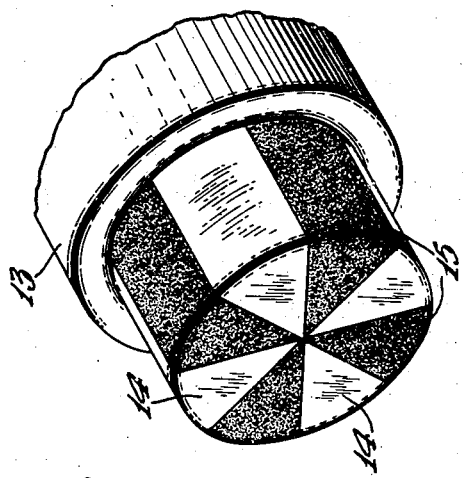
Fig. 2 is a view in perspective of the indicator housings.
Figure 4:
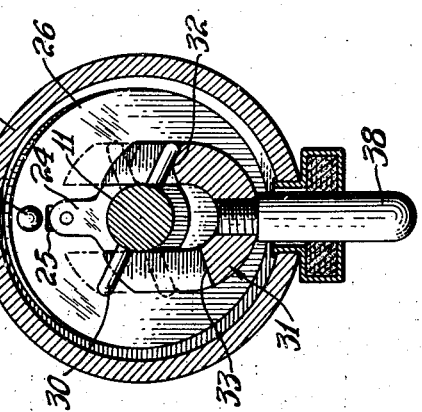

Fig. 3, 4 and 5 are cross-sectional views taken along lines 3—3, 4—4 and 5—5 of Fig. 1.

Referring to the drawings, the indicator comprises a housing made up of two telescoping tubular parts 1 and 2. Part 1 houses an electromagnet 3, the coil of which is retained in place by core 4, block 5 and end plate 6. If desired a bracket 7 may be mounted on housing 1 as shown where a contact pile is to be directly associated with the indicator. As shown, a contact pile 8 is mounted on the bracket 7. It will be recognized, however, that the indicator may be used independent of a contact pile and in that case the bracket 7 may be omitted.

The tubular part 2 houses the operating mechanism of the indicator. A bearing 9 is received therein and keyed to the housing 2 as indicated by pin 10. A spindle 11 is received in the bearing 9, and carries on one end thereof an indicator element 12, which in turn is housed by a cap 13 threadably received on the end of housing 2. The cap 13 is preferably of molded plastic material having transparent window sections 14 separated by opaque or colored sections 15. The indicator element is provided with sections of alternate coloring as indicated at 16 and 17, the color of sections 17 being the same as sections 15 of the cap so that when they coincide with windows 14 as shown the cap appears all one color. When the indicator element 12 moves to indicating position the areas 16 either white or a color different from sections 17 are exposed through windows 14.

The indicator element 12 is provided with a hub 18 which abuts bearing 9, the hub having a stop 19 for engagement with shoulders 20 on the housing 2 to limit the movement of the indicator element. The hub and the spindle are normally biased to move the indicator element toward indicating position by a spring 21 which has one end secured to the hub 18 and the other end retained in a slot 22 in bearing 9. The spindle is held in place in bearing 9 by a collar 23 which is press-fitted on to the spindle. The inner end of spindle 11 is provided with a crank 24 which is adapted to engage a recess in armature 26. The armature is normally biased to crank engaging position by a spring 27, the armature being retained on pins 28 and 29 which are anchored in block 5. Pin 28 limits the outward movement of the armature while pin 29 permits the armature to pivot.

When a subscriber's line is connected electrically to the indicator, the electromagnet 3 is energized thereby attracting the armature 26 which thereupon releases crank 24. The spindle revolves under the force of spring 21 and causes the indicator element 12 to assume an indicating position.

For reset purposes the spindle is provided with a pin 30, Fig. 4, which extends laterally thereof and is engaged by reset plunger 31. Reset plunger 31, is provided with a U-shaped portion having one surface 32 higher than the other surface 33. These two surfaces are utilized as follows: when the plunger 31 is lifted, surface 32 engages pin 30 to rotate the spindle to reset position, the surface 33 operating as a stop when the other end of pin 30 engages it. In this position of the spindle the crank 24 is received in recess 25 and latched to the armature 26.

In the embodiment shown the switchboard panel 34 is provided with a jack socket 35 in alignment with the contact pile 8. The uppermost contact spring 36 is provided with a stud 37 adapted to engage stem 38 of the plunger 31. Contact spring 39 which is adapted to be engaged by a jack plug (not shown) is provided with a stud 40 which engages spring 36 to break contacts 41 (which are closed by release of crank 24 through action of spring 21, pin 30 and plunger 31) and to actuate the plunger pin 38 to reset indicator element 12 and return the crank 24 to latching engagement with the armature 26.

While in the present embodiment the reset plunger is shown to be operated by insertion of a jack plug into the spring contact pile-up, it will be obvious to those skilled in the art that a push-button arrangement may be arranged to actuate the plunger where jack plugs and spring contact pile-up arrangements are not employed in association with the indicator. It will also be clear that while I have shown the housing made of two telescoping parts 1 and 2 it may be made in one part. The present housing is made in two parts to provide for a reduced size at the panel end and to facilitate assembling of parts.

The end of housing 2, Fig. 3 is provided with recesses 42 and 43, the recess 42 being adapted to receive a key projection 44 on panel 34 to retain the indicator in a desired position, and the recess 43 to receive stop pin 19.

The indicator with cap 13 removed is received in an opening in the panel and secured thereto by applying the cap 13 over the projecting end of housing 2. A threaded sleeve 45 is employed to clamp the indicator to the panel.

While I have described above the principles of my invention in connection with specific apparatus, it is to be clearly understood that this description is made only by way of example and not as a limitation of the scope of my invention.

I claim:

An indicator for switchboards comprising a spindle, indicator means carried by said spindle to provide a signal indication when moved to a given position, a spring normally urging said spindle to turn for movement of said indicator means to said given position, a latch to hold said spindle against turning movement, means to release said latch when a signal indication is desired, a pin carried by said spindle and disposed transversely of the axis thereof, a reset plunger having two spaced portions, said portions and said pin being arranged so that upon actuation of said plunger one portion engages said pin to rotate said spindle and the other portion engages said pin to limit the reset movement of said spindle.

CARL LOMHOLT.

REFERENCES CITED

The following references are of record in the file of this patent:

UNITED STATES PATENTS

| Number | Name | Date |
| --- | --- | --- |
| 134,053 | Hagendorf | Dec. 17, 1872 |
| 287,446 | Le Grande | Oct. 30, 1883 |
| 1,363,220 | Bascom | Dec. 28, 1920 |
| 2,012,650 | Yrisarri | Aug. 27, 1935 |
| 2,393,901 | Haigh et al. | Jan. 29, 1946 |

FOREIGN PATENTS

| Number | Country | Date |
| --- | --- | --- |
| 26,220 | Sweden | Sept. 11, 1907 |
| 123,644 | Austria | July 10, 1931 |
| 263,471 | Italy | Mar. 18, 1929 |
| 319,387 | Italy | July 9, 1934 |